(12) United States Patent
Gervais

(10) Patent No.: US 12,071,960 B2
(45) Date of Patent: Aug. 27, 2024

(54) DEWATERING PUMP SUPPORT APPARATUS

(71) Applicant: Darren James Gervais, Kincardine (CA)

(72) Inventor: Darren James Gervais, Kincardine (CA)

(*) Notice: Subject to any disclaimer, the term of this patent is extended or adjusted under 35 U.S.C. 154(b) by 305 days.

(21) Appl. No.: 17/453,203

(22) Filed: Nov. 2, 2021

(65) Prior Publication Data

US 2023/0138218 A1    May 4, 2023

(51) Int. Cl.
*F04D 29/70* (2006.01)
*B01D 35/26* (2006.01)
*B63B 22/24* (2006.01)
*F04D 29/60* (2006.01)

(52) U.S. Cl.
CPC ........... *F04D 29/708* (2013.01); *B01D 35/26* (2013.01); *B63B 22/24* (2013.01); *F04D 29/605* (2013.01)

(58) Field of Classification Search
CPC .... F04D 29/708; F04D 29/605; F04D 13/086; B01D 35/26; B63B 22/24
USPC .......................................................... 415/7
See application file for complete search history.

(56) References Cited

U.S. PATENT DOCUMENTS

| | | | | |
|---|---|---|---|---|
| 3,724,662 | A * | 4/1973 | Ortiz | E21B 43/0122 210/923 |
| 7,794,211 | B2 * | 9/2010 | Muhs | F04D 9/042 417/199.2 |
| 2011/0266201 | A1 * | 11/2011 | Perez | B01D 35/26 210/171 |
| 2012/0080363 | A1 * | 4/2012 | Evanovich | C10G 33/06 210/207 |

* cited by examiner

*Primary Examiner* — Hoang M Nguyen
(74) *Attorney, Agent, or Firm* — Orin Del Vecchio

(57) ABSTRACT

A dewatering pump support apparatus configured to buoyantly suspend a dewatering pump in a body of water in which all or some is desired to be removed. The dewatering pump support apparatus includes a main housing having at least one wall and a bottom configured to form an interior volume having an opening thereto. The main housing includes an upper perimeter edge wherein the upper perimeter edge includes flotation members secured thereto. The flotation members are circumferentially disposed around the main housing and provide buoyancy for the dewatering pump support apparatus. A strainer assembly is integrally secured to the main housing. The strainer assembly extends outward from the housing and includes a plurality of walls having a multitude of apertures formed therein. The strainer assembly further includes a flotation member and additionally can be configured with a slot allowing air into the strainer assembly.

9 Claims, 2 Drawing Sheets

DEWATERING PUMP SUPPORT APPARATUS

FIELD OF THE INVENTION

The present invention relates generally to water removal devices, more specifically but not by way of limitation, a dewatering pump support apparatus that is configured to receive and retain a dewatering pump therein wherein the device provides flotation for the dewatering pump so as to inhibit debris from entering the pump causing failure thereof.

BACKGROUND

Dewatering pumps are utilized in various applications to facilitate the removal of water. Construction sites, tunnels, mines and many other locations must often have dewatering pumps deployed so as to remove unwanted water. The pumps are typically placed near the water to be removed and an inlet hose is connected to the pump with the opposing end being placed in the water source. An outlet hose directs the water away from the area in which it is being removed. Most often these dewatering pumps are powered by a combustible engine and can be run for many hours capable of removing large amounts of water.

One issue with conventional dewatering pumps is their premature failure most often caused by debris entering the pump. In many applications where dewatering pumps are deployed the water has a high content of mud and debris. The mud and debris in the water often will enter the dewatering pump and result in the clogging thereof. Repetitive entry of mud and debris ultimately leads to failure of the dewatering pump, which can cost thousands of dollars. Another issue is that some pumps require the operator to potentially enter the water that is being removed which can present risks to the operator.

Accordingly, there is a need for a dewatering pump support apparatus that is configured to receive a dewatering pump and place the dewatering pump in a floating position in the water to be removed and is further constructed so as to inhibit debris from entering the dewatering pump.

SUMMARY OF THE INVENTION

It is the object of the present invention to provide a dewatering pump support apparatus that is configured to receive a dewatering pump therein wherein the present invention includes a main housing.

Another object of the present invention is to provide a floating support apparatus for a dewatering pump that is operable to float a dewatering pump in a body of water to be removed wherein the main housing includes a plurality of walls and a bottom forming an interior volume capable of receiving and retaining a dewatering pump therein.

A further object of the present invention is to provide a dewatering pump support apparatus that is configured to receive a dewatering pump therein wherein the bottom of the main housing is manufactured from suitable material.

Still another object of the present invention is to provide a floating support apparatus for a dewatering pump that is operable to float a dewatering pump in a body of water to be removed wherein the main housing includes flotation members circumferentially secured thereto proximate the opening of the main housing.

An additional object of the present invention is to provide a dewatering pump support apparatus that is configured to receive a dewatering pump therein that further includes a strainer assembly operably coupled with the main housing.

Yet a further object of the present invention is to provide a floating support apparatus for a dewatering pump that is operable to float a dewatering pump in a body of water to be removed wherein the strainer assembly includes a plurality of walls having apertures formed therein.

Another object of the present invention is to provide a dewatering pump support apparatus that is configured to receive a dewatering pump therein wherein the strainer assembly can be configured with an air vent in the top member thereof.

Still an additional object of the present invention is to provide a floating support apparatus for a dewatering pump that is operable to float a dewatering pump in a body of water to be removed wherein the main housing can be configured to be heated and can further be configured to have the flotation members be adjustable in position.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
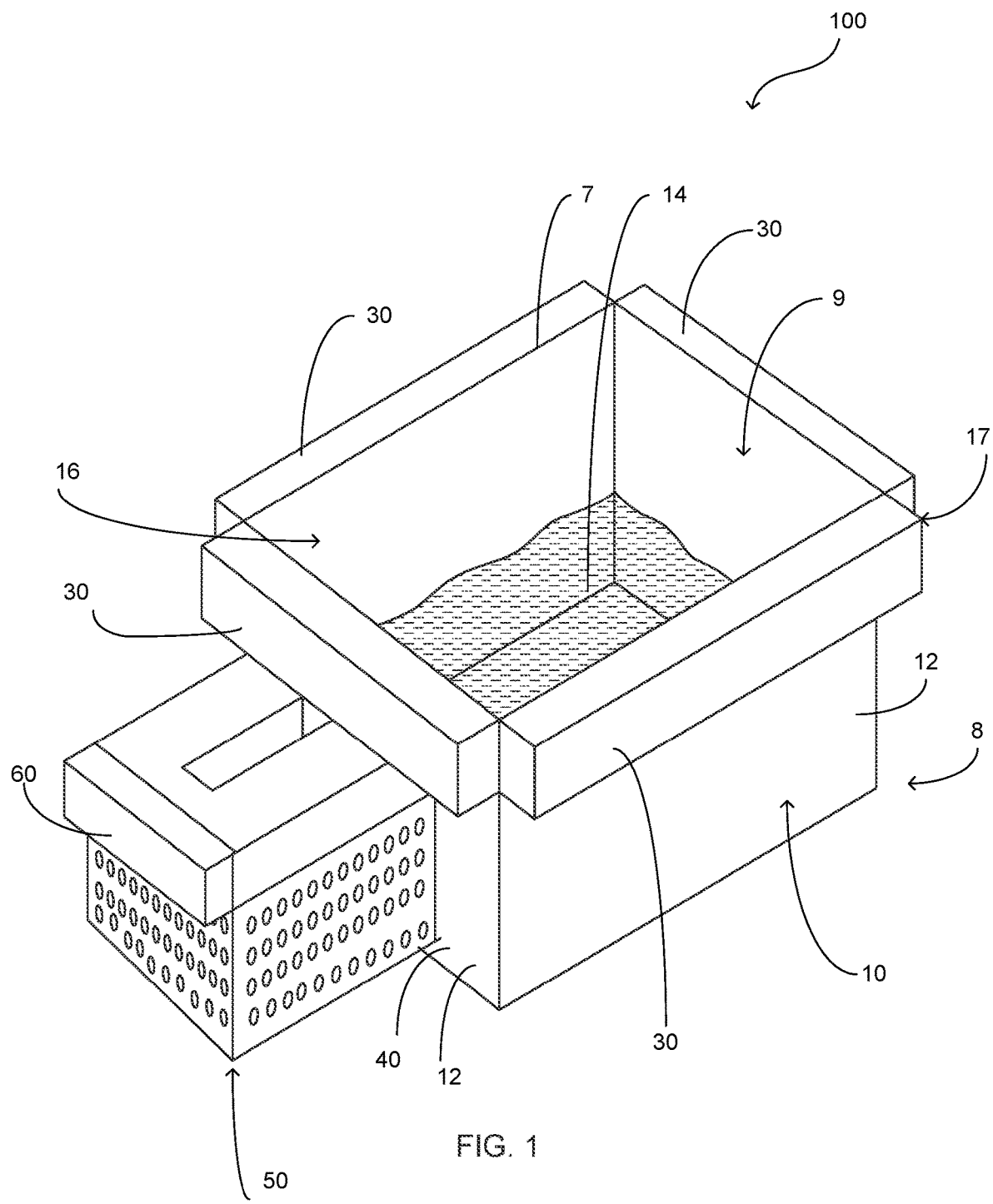
FIG. 1 is a perspective view of an embodiment of the present invention.
Figure 2:
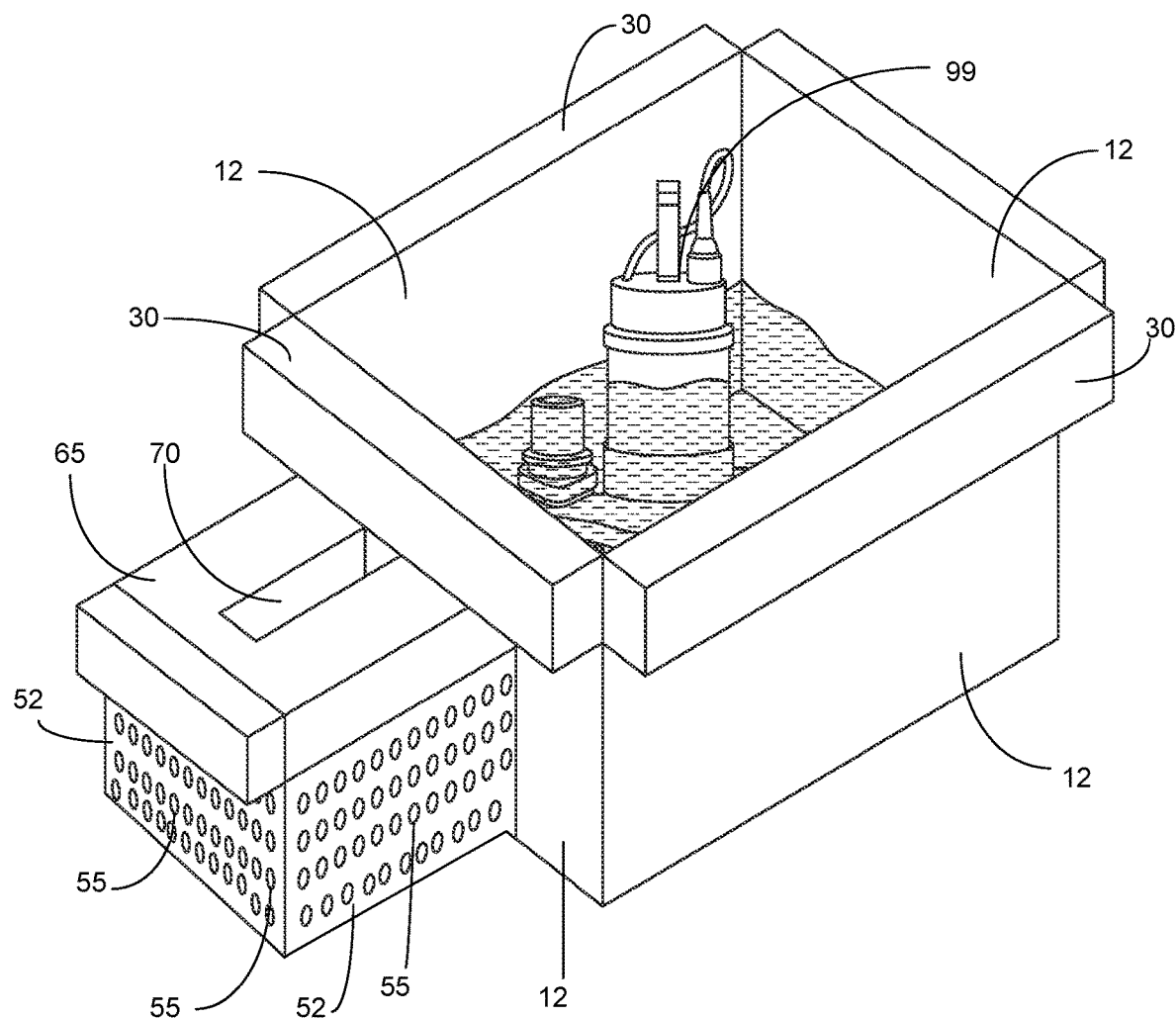
FIG. 2 is a perspective view of an embodiment of the present invention with an exemplary pump disposed therein.

Referring now to the drawings submitted herewith, wherein various elements depicted therein are not necessarily drawn to scale and wherein through the views and figures like elements are referenced with identical reference numerals, there is illustrated a dewatering pump support apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to Figures submitted as a part hereof, the dewatering pump support apparatus 100 includes a main housing 10. The main housing is manufactured from a durable rigid material such as but not limited to plastic or lightweight metal. The main housing 10 is operable to receive and support an exemplary dewatering pump 99 in the interior volume 9 thereof. It should be understood within the scope of the present invention that the main housing 10 could be provided in alternate sizes so as to accommodate various styles and sizes of dewatering pumps. The main housing 10 includes a plurality of walls 12 and a bottom 14 configured to define the interior volume 9. The walls 12 are contiguously formed utilizing suitable techniques. It should be understood within the scope of the present invention that while the main housing 10 is illustrated as having four walls 12 herein that it is contemplated within the scope of the present invention that the main housing 10 could be provided in alternate shapes and as such have as few as one wall or more than four walls.

The main housing 10 includes an opening 16 proximate the upper end 17 thereof. The opening 16 provides access to the interior volume 9 so as to place a dewatering pump 99 therein. The bottom 14 of the main housing 10 is proximate the lower end 8 thereof and is manufactured from similar rigid lightweight materials as the walls 12.

Secured to the main housing 10 proximate the upper end 17 thereof are flotation members 30. The flotation members 30 are secured to the main housing 10 proximate the upper end 17 thereof utilizing suitable durable techniques. The flotation members 30 are circumferentially present completely around the upper perimeter edge 7. The flotation members 30 are configured to provide buoyancy for the dewatering pump support apparatus 100 subsequent placing the dewatering pump support apparatus 100 in a body of water and further having a dewatering pump 99 placed into the interior volume 9. The flotation members 30 allow the dewatering pump apparatus 100 to be placed in water to be removed while further providing a more desirable positioning of the dewatering pump 99 so as to inhibit debris from entering thereinto. It should be understood within the scope of the present invention that the flotation members 30 could be constructed of various types of buoyant material or be provided in alternate construction so as to provide the desired buoyancy. Furthermore, it is contemplated within the scope of the present invention that the flotation members 30 could be provided in alternate configurations wherein the main housing 10 could have as few as one secured thereto along one wall 12 thereof.

Secured to the side wall 40 of the main housing 10 is the strainer assembly 50. The strainer assembly 50 is integrally coupled to the side wall 40 utilizing suitable durable techniques. The strainer assembly 50 is the area of the dewatering pump support apparatus 100 that functions as the intake area wherein the dewatering pump 99 is fluidly coupled thereto and water being introduced into the dewatering pump 99 passes through the strainer assembly 50. It should be understood within the scope of the present invention that any type of fluid transfer device or a portion thereof could be disposed within the main housing 10 in order to achieve the desired functionality discussed herein. By way of example but not limitation, a pipe end or suction hose could be disposed within the main housing 10. The strainer assembly 50 ensures significant reduction of debris being introduced into the dewatering pump 99 and as such reduces the problems caused thereby. The strainer assembly 50 includes a plurality of walls 52 that are integrally formed wherein the walls 52 have a multitude of apertures 55 formed therein. The apertures 55 provide filtration of water entering the strainer assembly 50 so as to inhibit debris from entering the dewatering pump 99. It should be understood within the scope of the present invention that the strainer assembly 50 could be configured with an alternate quantities of walls and further have various arrangements of apertures or other elements operable to provide filtration of water entering thereinto.

The strainer assembly 50 further includes its own flotation member 60 secured to the top 65 thereof and provides additional flotation for the strainer assembly 50 so as to ensure general level orientation of the dewatering pump support apparatus 100 subsequent the dewatering pump support apparatus 100 be placed in a body of water. Formed in the top 65 is slot 70 wherein slot 70 is formed completely through the top 65. Slot 70 is operable to provide a venting technique to ensure proper water flow into the dewatering pump 99 during operation thereof. This structure is created so as to eliminate or reduce any creation of a vacuum, which would result in potential damage to the dewatering pump 99. It should be understood within the scope of the present invention that the slot 70 could be formed in alternate sizes and shapes. Additionally, while desired in a preferred embodiment of the present invention, it is contemplated within the scope of the present invention that the strainer assembly 50 could be provided without a slot 70 formed in the top 65 thereof. While one strainer assembly 50 is illustrated and discussed herein, it is contemplated within the scope of the present invention that the main housing 10 could have more than one strainer assembly 50 operably coupled thereto.

While not particularly illustrated herein, it is contemplated within the scope of the present invention that the flotation members 30 could be movably secured to the main housing 10 so as to adjust the flotation level of the main housing 10 and as such the position of the exemplary dewatering pump 99 disposed within the interior volume 9. Additionally, it is further contemplated within the scope of the present invention that the main housing 10 could be provided with a heat source so as to facilitate an ability to have the main housing 10 placed in a body of water that may be exposed to freezing and as such inhibit the freezing of water in areas adjacent to the main housing 10. While the dewatering pump support apparatus 100 in a preferred embodiment is operable to buoyantly support a device configured to remove water, it should be understood within the scope of the present invention that alternate types of fluids could be transferred.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A fluid transfer support apparatus that is configured to buoyantly suspend a fluid transfer device or portion thereof in a body of water wherein the fluid transfer support apparatus comprises:
   a main housing, said main housing having at least one wall and a bottom configured to form an interior volume, said main housing having a lower end and an upper end, said main housing having an opening proximate said upper end, said main housing having an upper perimeter edge;
   at least one flotation member, said at least one flotation member being secured to said main housing proximate said upper perimeter edge, said at least one flotation member configured to provide buoyancy for the fluid transfer support apparatus; and
   a strainer assembly, said strainer assembly operably coupled with said at least one wall of said main housing, said strainer assembly configured to permit water to flow into said interior volume of said main housing so as to be evacuated by the fluid transfer device and further including at least one flotation member on the strainer assembly.

2. The fluid transfer support apparatus as recited in claim 1, wherein the strainer assembly includes a plurality of walls and bottom configured to form an interior volume.

3. The fluid transfer support apparatus as recited in claim 2, and further including a plurality of apertures, wherein the plurality of apertures are formed in each of said plurality of walls of said strainer assembly.

4. The fluid transfer support apparatus as recited in claim 3, wherein said strainer assembly further includes a top member, said top member having a slot formed therein.

5. The fluid transfer support apparatus as recited in claim 4, wherein said main housing further includes a heating element so as to maintain a temperature of the main housing at a temperature greater than that of surroundings of the dewatering pump support apparatus.

6. A dewatering pump support apparatus that is configured to buoyantly suspend a dewatering pump in a body of water so as to inhibit debris from entering the dewatering pump wherein the dewatering pump apparatus comprises:
   a main housing, said main housing having a plurality of walls and a bottom configured to form an interior volume, said main housing being square in shape, said main housing having a lower end and an upper end, said main housing having an opening proximate said upper end, said main housing having an upper perimeter edge, said main housing being manufactured from a lightweight rigid material;
   four flotation members, said four flotation members being secured to each of said plurality of walls of said main housing proximate said upper perimeter edge, said four flotation members configured to provide buoyancy for the dewatering pump support apparatus; and
   a strainer assembly, said strainer assembly operably coupled with one of said four walls of said main housing, said strainer assembly configured to permit water to flow into said interior volume of said main housing so as to be evacuated by the dewatering pump, said strainer assembly including a plurality of walls, a bottom defining an interior volume, and a top member, said top member having a slot formed therein, said slot operable to inhibit a vacuum from forming in said interior volume of said strainer assembly said strainer assembly operable to inhibit debris from entering said interior volume of said main housing.

7. The dewatering pump support apparatus configured to buoyantly suspend the dewatering pump in a body of water as recited in claim 6, and further including a plurality of apertures, wherein the plurality of apertures are formed in each of said plurality of walls of said strainer assembly, said plurality of apertures configured to inhibit debris from entering the interior volume of said strainer assembly.

8. The dewatering pump support apparatus configured to buoyantly suspend the dewatering pump in a body of water as recited in claim 6, a strainer assembly flotation member, said strainer assembly flotation member being secured to said strainer assembly proximate the top thereof.

9. The dewatering pump support apparatus configured to buoyantly suspend the dewatering pump in a body of water as recited in claim 8, wherein said main housing further includes a heating element so as to maintain a temperature of the main housing at a temperature greater than that of surroundings of the dewatering pump support apparatus.

* * * * *